United States Patent [19]

Pomplun et al.

[11] 4,436,867

[45] Mar. 13, 1984

[54] CREPING ADHESIVES CONTAINING POLY 2-ETHYL-2-OXAZOLINE

[75] Inventors: William S. Pomplun, Winnebago County; Herbert E. Grube, Outagamie County, both of Wis.

[73] Assignee: Kimberly-Clark Corporation, Neenah, Wis.

[21] Appl. No.: 389,193

[22] Filed: Jun. 17, 1982

[51] Int. Cl.³ .................... C08L 29/04; C08L 39/06; B31F 1/12
[52] U.S. Cl. ................................. 524/503; 162/111; 162/112; 524/501; 524/502; 525/56; 525/417
[58] Field of Search .......................... 525/55, 56, 417; 524/501, 502, 503; 162/112, 117

[56] References Cited

U.S. PATENT DOCUMENTS

| | | | |
|---|---|---|---|
| 4,063,995 | 12/1977 | Grossman | 162/112 |
| 4,128,518 | 12/1978 | Oyamada et al. | 524/501 |
| 4,251,400 | 2/1981 | Columbus | 524/501 |
| 4,258,163 | 3/1981 | Mariasi et al. | 525/56 |
| 4,304,625 | 12/1981 | Grube et al. | 162/111 |

*Primary Examiner*—Allan Lieberman
*Attorney, Agent, or Firm*—Gregory E. Croft; R. Jonathan Peters; Howard Olevsky

[57] ABSTRACT

A creping adhesive comprises an admixture of poly 2-ethyl-2-oxazoline and a high molecular weight thermoplastic polymer.

5 Claims, No Drawings

CREPING ADHESIVES CONTAINING POLY 2-ETHYL-2-OXAZOLINE

FIELD OF THE INVENTION

This invention relates to adhesive compositions and, more particularly, to adhesive compositions useful for creping paper webs which have been substantially dried prior to contact with the creping cylinder.

BACKGROUND OF THE INVENTION

In the production of certain paper products such as facial tissues, paper towels, napkins, and the like, an aqueous slurry of wood fibers (pulp) is deposited on a moving foraminous fabric in such a manner so as to form a thin layer or web of fibers. The resulting web is then dewatered, dried, creped, and wound up on large rolls.

Creping of the web is a well known method for improving the properties of softness and bulk by breaking interfiber bonds. This is commonly accomplished by adhering the web to the surface of a large, rotating drum (Yankee dryer) and thereafter dislodging the web with a doctor blade. As the web contacts the edge of the doctor blade, it experiences compressive forces which disrupt the internal structure and cause the web to buckle, forming a series of peaks and valleys in the web as it leaves the doctor blade. The creping process with the attendant use of creping adhesives is well known in the industry and is adequately described in U.S. Pat. No. 4,304,625 issued Dec. 8, 1981 to H. E. Grube and T. D. Ries, which is hereby incorporated by reference.

More recently, drying of the web by a method known as throughdrying has received considerable attention because of its contribution to improved bulk and softness of the web during drying. This is generally accomplished by passing hot air through the web to effect partial drying prior to pressing the web against the Yankee dryer to finish the drying process. However, one disadvantage of partial drying prior to the Yankee is that the resulting partially dried web requires the addition of a creping adhesive to the surface of the Yankee (or any other creping cylinder which may be used) in order to provide sufficient adhesion of the web to the cylinder necessary to obtain proper creping. This was generally not necessary in more conventional processes where the high moisture content of the web provided sufficient adhesion to the Yankee cylinder. Although creping adhesives may have been used previously from time to time to supplement the natural adhesion of the wet web, the need for creping adhesives has been greatly increased with the advent of throughdrying.

A creping adhesive commonly used for throughdrying processes consists of a blend of ethylene/vinyl acetate copolymer and polyvinyl alcohol. This composition is satisfactory for a wide range of applications, but suffers from build-up of water insoluble residues on process fabrics. The disclosed adhesive comprising poly 2-ethyl-2-oxazoline and polyvinyl alcohol provides good web bonding properties to the surface of the Yankee dryer while allowing easy cleanup of residues on process fabrics by virtue of the adhesive's water solubility.

SUMMARY OF THE INVENTION

In one aspect, the invention resides in a creping adhesive for use in a throughdrying process for the manufacture of creped wadding, said creping adhesive comprising an admixture of poly 2-ethyl-2-oxazoline and a high molecular weight thermoplastic polymer having sufficient strength to form an adhesive film. These creping adhesives can be applied to the creping cylinder or the web itself either by printing or spraying with proper adjustment of the viscosity and solids content of the adhesive. Advantageously, the creping adhesives of this invention provide a protective coating to the surface of the creping cylinder and prolong the effective life of the doctor blade. Most importantly, however, they are water soluble and are more easily removed from the process fabrics on which creping adhesives tend to accumulate.

The high molecular weight thermoplastic polymer component can be any thermoplastic polymer available in water-dispersed or water-solution form having a molecular weight of from about 6,000 to about 100,000. Any such polymers will inherently have sufficient strength to form an adhesive film for purposes of this invention. Particularly suitable thermoplastic polymers include polyvinyl alcohol, ethylene/vinyl acetate copolymer, and polyvinyl pyrrolidone.

The relative amounts of poly 2-ethyl-2-oxazoline and the thermoplastic polymer will vary depending upon the degree of adhesion required for the particular application. In general, the amount of poly 2 ethyl-2-oxazoline can be from about 5 to about 60 dry weight percent of the adhesive composition. For example, when used in admixture with polyvinyl alcohol, the amount of poly 2-ethyl-2-oxazoline can be from about 40 to about 60 dry weight percent of the adhesive composition. When used in admixture with ethylene/vinyl acetate copolymer, the amount of poly 2-ethyl-2oxazoline can be from about 5 percent to about 60 dry weight percent of the adhesive composition. Because the poly 2-ethyl-2-oxazoline acts as a modifier for the thermoplastic film-former, the relative amounts of each necessarily varies with the particular thermoplastic polymer chosen. Nevertheless, the poly 2-ethyl-2-oxazoline in each case serves to improve water solubility, which is necessary to improve the cleanability of the fabrics used in the papermaking process that are continuously exposed to build-up of creping adhesives. For purposes herein, fabric cleanability represents the ability to remove adhesive residues from process fabrics with water, steam, and/or mechanical cleaning techniques without shutting down the creped wadding process and removing process fabrics.

The invention will be described in more detail by the following examples:

EXAMPLE 1

Preparation of Creping Adhesives Containing Poly 2-Ethyl-2-Oxazoline.

In preparing a creping adhesive in accordance with this invention, two aqueous solutions were first prepared which contain the poly 2-ethyl-2-oxazoline and the thermoplastic film-former, respectively. The first solution was prepared by dissolving 40 weight percent of poly 2-ethyl-2-oxazoline in a hot, stirred water bath. The temperature of the bath was maintained at about 180°–185° F. The second solution was prepared by dissolving 40 weight percent of a polyvinyl alcohol[1] in a hot, stirred water bath at about the same temperature.

[1] Gelvatol 40–20 manufactured by Monsanto Chemical Co.

The two solutions were combined by adding the second solution (polyvinyl alcohol) to an equal amount of the first solution (poly 2-ethyl-2-oxazoline) with stirring.

In addition, 0.2 weight percent each of a protective colloid[2], an antifoaming agent[3], and an antimicrobial agent[4], can be added to improve the storage stability and application of the adhesive. These additives are conventional for their intended purposes and are not necessary to achieve the improved fabric cleanability exhibited by the creping adhesives of this invention.

[2] Witconal 1206 manufactured by Witco Chemical Co. [3] Colloid 513 manufactured by Colloid, Inc. [4] Metasol TK100 manufactured by Merck Chemical Co.

EXAMPLE 2

Fabric Cleanability Test

A 20 weight percent solids solution of the creping adhesive to be tested was applied to a tared 2×4 inch piece of conventional polyester transfer fabric using a one inch paint brush. The adhesive was allowed to air-dry on the fabric, which was then placed in a 250° F. oven overnight. The dried adhesive-treated fabric was reweighed to determine dry adhesive add-on to the fabric.

The adhesive-treated fabric was placed into an agitated 180°–185° F. tap water bath for one hour to wash the fabric. The washed fabric was then removed, rinsed with hot tap water, and placed in a 200° F. oven for one hour. After drying, the fabric was reweighed to determine the weight loss due to washing. Based on this data, the percentage of adhesive washed off the fabric was calculated (Fabric Cleanability). This test was run in triplicate for each adhesive example.

The creping adhesive described in Example 1 was used in the above-described procedure and compared to a standard adhesive commonly used in the papermaking industry, namely a 70/30 blend of ethylene/vinyl acetate copolymer and polyvinyl alcohol. The results are summarized in tabular form below:

| Adhesive | Fabric Cleanability |
| --- | --- |
| Standard | 47% |
| Sample 1 | 100% |

These results clearly indicate the improvement in fabric cleanability obtained when using a creping adhesive comprising poly 2-ethyl-2-oxazoline as compared to using a conventional creping adhesive.

It will be appreciated that these examples, shown for purposes of illustration, are not to be construed as limiting the scope of this invention, which is defined by the following claims.

We claim:

1. A creping adhesive for use in a throughdrying process for the manufacture of creped wadding, said creping adhesive consisting essentially of an aqueous admixture of from about 5 to about 60 dry weight percent poly 2-ethyl-2-oxazoline and a thermoplastic polymer having sufficient strength to form an adhesive film, said thermoplastic polymer being selected from the group consisting of polyvinyl alcohol, ethylene/vinyl acetate copolymer, and polyvinyl pyrrolidone.

2. The creping adhesive of claim 1 wherein the thermoplastic polymer is polyvinyl alcohol.

3. The creping adhesive of claim 2 consisting essentially of from about 40 to about 60 weight percent polyvinyl alcohol and from about 40 to about 60 weight percent poly 2-ethyl-2-oxazoline.

4. The creping adhesive of claim 1 wherein the thermoplastic polymer is an ethylene/vinyl acetate copolymer.

5. The creping adhesive of claim 1 wherein the thermoplastic polymer is polyvinyl pyrrolidone.

* * * * *